United States Patent
Qin (10) Patent No.: US 11,148,754 B2
(45) Date of Patent: Oct. 19, 2021

(54) REAR DERAILLEUR HAVING ROTATION RESISTANCE FUNCTION APPLICATION AND RESISTANCE APPLICATION METHOD

(71) Applicant: S-Ride Bicycle Components (Foshan) Co., Ltd., Foshan (CN)

(72) Inventor: Ruizan Qin, Foshan (CN)

(73) Assignee: S-Ride Bicycle Components (Foshan) Co., Ltd.

(*) Notice: Subject to any disclaimer, the term of this patent is extended or adjusted under 35 U.S.C. 154(b) by 253 days.

(21) Appl. No.: 16/496,589

(22) PCT Filed: Mar. 16, 2018

(86) PCT No.: PCT/CN2018/079297
§ 371 (c)(1),
(2) Date: Sep. 23, 2019

(87) PCT Pub. No.: WO2018/171522
PCT Pub. Date: Sep. 27, 2018

(65) Prior Publication Data
US 2020/0317292 A1 Oct. 8, 2020

(30) Foreign Application Priority Data
Mar. 24, 2017 (CN) .......................... 201710183814.7

(51) Int. Cl.
*B62M 9/1248* (2010.01)
(52) U.S. Cl.
CPC ................................ *B62M 9/1248* (2013.01)

(58) Field of Classification Search
CPC .... B62M 9/1248; B62M 9/126; B62M 9/121; B62M 9/16
(Continued)

(56) References Cited

U.S. PATENT DOCUMENTS 4,406,643 A * 9/1983 Shimano ................. B62M 9/126
474/80
8,852,041 B2 * 10/2014 Yamaguchi ............ B62M 9/126
474/80
(Continued)

FOREIGN PATENT DOCUMENTS

CN 102442403 A 5/2012
CN 103373435 A 10/2013
(Continued)

*Primary Examiner* — Henry Y Liu
(74) *Attorney, Agent, or Firm* — The Webb Law Firm (57) ABSTRACT

A rear derailleur with rotation resistance application function includes a base member, a link assembly, a movable member, and a chain guide, wherein the base member is mounted on a frame; the link assembly is flexibly connected between the base member and the movable member; and the chain guide is connected to the movable member via a rotation-with-resistance structure. The rotation-with-resistance structure includes a rotary shaft, a one-way bearing and a resistance application spring, wherein the rotary shaft is disposed on the movable member or the chain guide; the one-way bearing matched with the rotary shaft is correspondingly disposed on the chain guide or the movable member; and the rotary shaft forms an interference fit with an inner hole of the one-way bearing. The rear derailleur can effectively prevent a chain from coming off during bumping.

9 Claims, 8 Drawing Sheets

(58) Field of Classification Search
USPC .................................................. 474/80, 82
See application file for complete search history.

(56) References Cited

U.S. PATENT DOCUMENTS

| | | | | |
|---|---|---|---|---|
| 8,870,693 B2* | 10/2014 | Shahana | ................ | B62M 9/121 474/80 |
| 9,187,149 B2* | 11/2015 | Yamaguchi | ............ | B62M 9/126 |
| 9,751,590 B2* | 9/2017 | Shipman | ................ | B62M 9/128 |
| 2006/0116227 A1* | 6/2006 | Mercat | ................. | B62M 9/12 474/82 |
| 2007/0219029 A1* | 9/2007 | Turner | ................... | B62M 9/16 474/80 |
| 2009/0054183 A1* | 2/2009 | Takachi | ............... | B62M 9/1248 474/80 |
| 2009/0291789 A1* | 11/2009 | Ishikawa | ............. | B62M 9/1248 474/82 |
| 2012/0083371 A1* | 4/2012 | Yamaguchi | ............ | B62M 9/126 474/80 |
| 2012/0083372 A1* | 4/2012 | Yamaguchi | ............ | B62M 9/126 474/80 |
| 2013/0090196 A1* | 4/2013 | Yamaguchi | .......... | B62M 9/1244 474/80 |
| 2013/0203532 A1* | 8/2013 | Jordan | ................ | B62M 9/1248 474/82 |
| 2013/0288834 A1* | 10/2013 | Yamaguchi | .......... | B62M 9/1244 474/80 |
| 2013/0310204 A1* | 11/2013 | Shahana | ................ | B62M 9/121 474/80 |
| 2014/0162817 A1* | 6/2014 | Yamaguchi | ............ | B62M 9/122 474/80 |
| 2014/0162818 A1* | 6/2014 | Yamaguchi | ............. | F16H 61/68 474/80 |
| 2014/0213397 A1* | 7/2014 | Yamaguchi | ............ | B62K 23/04 474/80 |
| 2014/0296009 A1* | 10/2014 | Suyama | ................ | B62M 9/122 474/80 |
| 2014/0371013 A1* | 12/2014 | Yamaguchi | .............. | B62M 9/16 474/122 |
| 2014/0378252 A1* | 12/2014 | Carrasco Vergara | .. | B62M 25/08 474/82 |
| 2015/0031483 A1* | 1/2015 | Yamaguchi | ............ | B62M 9/126 474/80 |
| 2015/0072816 A1* | 3/2015 | Yamaguchi | ........... | F16H 7/0829 474/113 |
| 2015/0072817 A1* | 3/2015 | Yamaguchi | ............... | F16H 7/10 474/113 |
| 2016/0046352 A1* | 2/2016 | Shipman | ................ | B62M 9/126 474/80 |
| 2016/0176478 A1* | 6/2016 | Chang | ...................... | B62M 9/16 474/69 |
| 2016/0304161 A1* | 10/2016 | Shirai | ..................... | B62M 9/126 |
| 2016/0318582 A1* | 11/2016 | Johnson | ................. | B62K 23/04 |
| 2017/0113760 A1* | 4/2017 | Lin | ..................... | B62M 9/1248 |
| 2017/0174289 A1* | 6/2017 | Wu | ........................ | B62M 9/16 |
| 2017/0283004 A1* | 10/2017 | Calendrille | ......... | B62M 9/1244 |
| 2017/0295319 A1* | 10/2017 | Komemushi | .......... | H04N 5/265 |
| 2017/0343063 A1* | 11/2017 | Chan | .................... | B60B 27/047 |
| 2017/0355423 A1* | 12/2017 | Celi | .......................... | F16F 9/19 |
| 2018/0148129 A1* | 5/2018 | Bernardele | .......... | B62M 9/1244 |

FOREIGN PATENT DOCUMENTS

| | | |
|---|---|---|
| CN | 203332335 U | 12/2013 |
| CN | 104260821 A | 1/2015 |
| CN | 105365995 A | 3/2016 |
| CN | 106741556 A | 5/2017 |
| CN | 206569216 U | 10/2017 |

* cited by examiner

REAR DERAILLEUR HAVING ROTATION RESISTANCE FUNCTION APPLICATION AND RESISTANCE APPLICATION METHOD

CROSS-REFERENCE TO RELATED APPLICATIONS

This application is the United States national phase of International Application No. PCT/CN2018/079297 filed Mar. 16, 2018, and claims priority to Chinese Patent Application No. 201710183814.7 filed Mar. 24, 2017, the disclosures of each of which are hereby incorporated by reference in their entireties.

FIELD OF TECHNOLOGY

The present invention relates to a bicycle speed change device, in particular to a rear derailleur with rotation resistance application function and resistance application method.

BACKGROUND

A bicycle speed change device realizes speed change by switching a chain to sprockets with different diameters. During speed adjustment, since the length of the chain is fixed, the chain becomes loose or tight when the chain is switched between the sprockets with different diameters. Specifically, when the chain is switched from a small sprocket to a large sprocket, the chain becomes tight; and when the chain is switched from a large sprocket to a small sprocket, the chain will becomes loose. In order to ensure that the chain is in an appropriate tensioning state all the time during speed change, the bicycle speed change device tensions the chain via a chain guide disposed in a rear derailleur; the chain guide is connected to a movable member of the rear derailleur via a rotary structure; the chain is wound on a tension pulley on the chain guide; a spring for generating a bias pressure is disposed between the chain guide and a speed adjustment bracket; the elastic force of the spring enables the chain guide to rotate backwards to tension the chain; when the chain is switched between different sprockets, if the chain becomes loose, then the chain guide rotates backwards for a certain angle under the action of the spring so as to tension the chain; and if the chain becomes tight, the chain guide would overcome the elastic force of the spring, and rotates forwards for a certain angle; therefore, the chain is in an appropriate tensioning state all the time during speed change.

However, in a riding process of the bicycle, the rugged road would cause bumping and vibration. During the bumping and vibration, under the action of inertia, the chain guide would overcome the elastic force of the spring, and rotates forwards, in which process the chain would become loose; therefore, the chain would be easy to come off, and riding safety would be affected. In order to solve the problem, the invention patent No. CN103373435B discloses "a bicycle transmission"; the bicycle transmission applies a resistance to a chain guide (equivalent to the chain guide in the present application) via a resistance application element, such that the chain guide cannot easily rotate forwards. The resistance application element mainly comprises a one-way clutch and a friction application member, wherein the one-way clutch is a one-way bearing; a rotary shaft of the chain guide is connected to an inner ring of the one-way bearing; the friction application member is an elastic friction plate wrapping an outer ring of the one-way bearing, and is used to apply to the bearing outer ring a resistance for preventing the same from rotating; the rotation direction of the one-way bearing corresponds to the backward rotation direction of the chain guide; therefore, when the chain becomes loose during speed adjustment, the chain guide can, under the action of a spring, freely rotate backwards to tension the chain; and when the chain becomes tight during speed adjustment, a rider can operate the transmission to generate to the chain guide a forward moment greater than a friction resistance moment applied to the bearing outer ring by the friction application member, such that the chain guide can still rotate forwards and the chain is ensured in an appropriate tensioning state; furthermore, the friction resistance moment applied to the bearing outer ring by the friction application member can resist the forward rotation moment generated to the chain guide when the bicycle bumps, thus solving the problem that the chain is easy to come off during bumping. However, the above-described patent solution still has the following defects: a friction application member and a resistance control element for controlling the friction application member to generate a resistance are required to be provided, thus the structure is complex and the manufacturing cost is improved.

SUMMARY

In order to solve the above-described problems, one object of the present invention is to provide a rear derailleur with rotation resistance application function. The rear derailleur not only can effectively prevent a chain from coming off during bumping, but also has a simple structure and low cost, thus facilitating popularization and application.

Another object of the present invention is to provide a resistance application method for applying resistance to a chain guide in the rear derailleur.

The objects of the present invention are realized through the following technical solution:

A rear derailleur with rotation resistance application function, comprising a base member, a link assembly, a movable member, and a chain guide, wherein the base member is mounted on a frame; the link assembly is flexibly connected between the base member and the movable member; the chain guide is connected to the movable member via a rotation-with-resistance structure; the rotation-with-resistance structure comprises a rotary shaft, a one-way bearing and a resistance application spring, wherein the rotary shaft is disposed on the movable member or the chain guide; the one-way bearing matched with the rotary shaft is correspondingly disposed on the chain guide or the movable member; the rotary shaft forms an interference fit with an inner hole of the one-way bearing, wherein the free rotation direction of the one-way bearing corresponds to the backward rotation direction of the chain guide; the interference between the rotary shaft and the inner hole of the one-way bearing is x; the rotation resistance moment corresponding to the interference x is M(x); the operation moment applied to the chain guide during a speed change operation is M1; and the maximum preset moment the chain guide can resist when a bicycle bumps is M2, M2<M(x)<M1.

In a preferred solution of the present invention, the rotary shaft is disposed on the movable member, and the one-way bearing is disposed on the chain guide.

In a preferred solution of the present invention, the chain guide comprises a first chain guide plate, a second chain guide plate, a guide pulley, a tension pulley and a one-way bearing seat, wherein the guide pulley and the tension pulley are respectively fixed between the first chain guide plate and the second chain guide plate via bolts; the one-way bearing seat is fixed on the first chain guide plate via bolts; and the one-way bearing is disposed in the one-way bearing seat.

In a preferred solution of the present invention, the one-way bearing comprises a roller pin, a support bracket and a shell, wherein the shell is polygonal; a polygonal groove matched with the polygonal shell of the one-way bearing is disposed in the one-way bearing seat; and the one-way bearing is embedded in the polygonal groove.

In a preferred solution of the present invention, seal rings are disposed in the polygonal groove on the two sides of the one-way bearing.

In a preferred solution of the present invention, the movable member comprises a shell; and the rotary shaft is mounted in a mounting groove of the shell via a mounting portion at an end thereof, and is fastened via bolts.

In a preferred solution of the present invention, the resistance application spring is a torsion spring; a first end of the resistance application spring is inserted in an inner groove of the shell of the movable member, and a second end is inserted in a groove of the one-way bearing seat; and the resistance application spring generates a bias pressure for enabling the chain guide to rotate backwards.

In a preferred solution of the present invention, the base member is mounted on a frame tail hook; the link assembly is connected between the base member and the movable member via a pin shaft; the link assembly comprises a first link member and a second link member; the base member, the first link member, the second link member and the movable member form a parallelogram structure; the movable member is connected with a reset spring; and the reset spring bias-compresses the movable member transversely outwardly relative to a plurality of rear sprockets, enabling the parallelogram structure to have a trend to maintain at a position with minimum contraction.

A resistance application method for applying resistance to a chain guide in the rear derailleur, comprising the steps of:

(1) disposing a rotation-with-resistance structure between the movable member and the chain guide of the rear derailleur, wherein the rotation-with-resistance structure comprises a rotary shaft, a one-way bearing and a resistance application spring; the rotary shaft is disposed on the movable member, and the one-way bearing is disposed on the chain guide; alternatively, the rotary shaft is disposed on the chain guide, and the one-way bearing is disposed on the movable member.

(2) applying an elastic force by the resistance application spring to the chain guide, and enabling the chain guide to always have a trend to rotate backward, wherein the rotary shaft forms an interference fit with an inner hole of the one-way bearing; and the free rotation direction of the one-way bearing corresponds to the backward rotation direction of the chain guide;

(3) setting the interference between the rotary shaft and the inner hole of the one-way bearing as x, setting the rotation resistance moment corresponding to the interference x and generated by the one-way bearing to the rotary shaft in a non-free rotation direction as $M(x)$; the operation moment applied to the chain guide during a speed change operation is $M1$; and the maximum preset moment the chain guide can resist when a bicycle bumps is $M2$, $M2<M(x)<M1$.

Compared with the prior art, the present invention has the following beneficial effects:

1. The present invention utilizes the one-way rotation characteristic of the one-way bearing to ensure that the chain guide can freely rotate backwards, and skillfully utilizes the rotation obstruction characteristic of the one-way bearing in another direction to resist the forward rotation moment when the chain guide bumps; by reasonably setting an interference x between the rotary shaft and the inner hole of the one-way bearing, the one-way bearing can generate a rotation resistance moment $M(x)$ to the rotary shaft in a non-free rotation direction; the rotation resistance moment $M(x)$ is related to the interference x; the greater the interference x is, the greater the rotation resistance moment $M(x)$ is, and vice versa; therefore, the value of the rotation resistance moment $M(x)$ can be set by designing a specific interference x; the operation moment $M1$ generated to the chain guide during a speed change operation can also be determined; the operation moment $M1$ enables the chain guide to rotate forwards; furthermore, the maximum moment $M2$ that the chain guide can resist when the bicycle bumps is an expected value, and can be set according to practical situations. Therefore, setting $M(x)$ greater than $M2$ and less than $M1$ can achieve the objects of not influencing a normal speed change operation and resisting the moment during bumping. In conventional thinking, the interference between the rotary shaft and the inner hole of the one-way bearing is set from the angle of effectively preventing the relative rotation of the two, but does not consider that the appropriate reduction of the interference enables the one-way bearing to have a resistance characteristic and a rotation characteristic; breaking through the thinking habit in combination with specific requirements, and applying the one-way bearing in a diametrically opposite way are the core of the technical concept of the present invention.

2. The present invention can realize the functions of a one-way bearing, a friction application member and a resistance control element in the prior art only by adopting a one-way bearing, thus greatly simplifying structure, reducing the manufacturing cost, and facilitating popularization and application.

3. The one-way bearing is generally a standard component; therefore, the rotation resistance moment $M(x)$ can be adjusted only by controlling the size of the rotary shaft during machining, and does not required to be controlled by a complex resistance control element like the prior art.

DESCRIPTION OF THE EMBODIMENTS

To enable a person skilled in the art to better understand the technical solution of the present invention, the present invention will be further explained hereafter in connection with the drawings and an embodiment. However, the embodiment is not intended to restrict the present invention.

Figure 1:
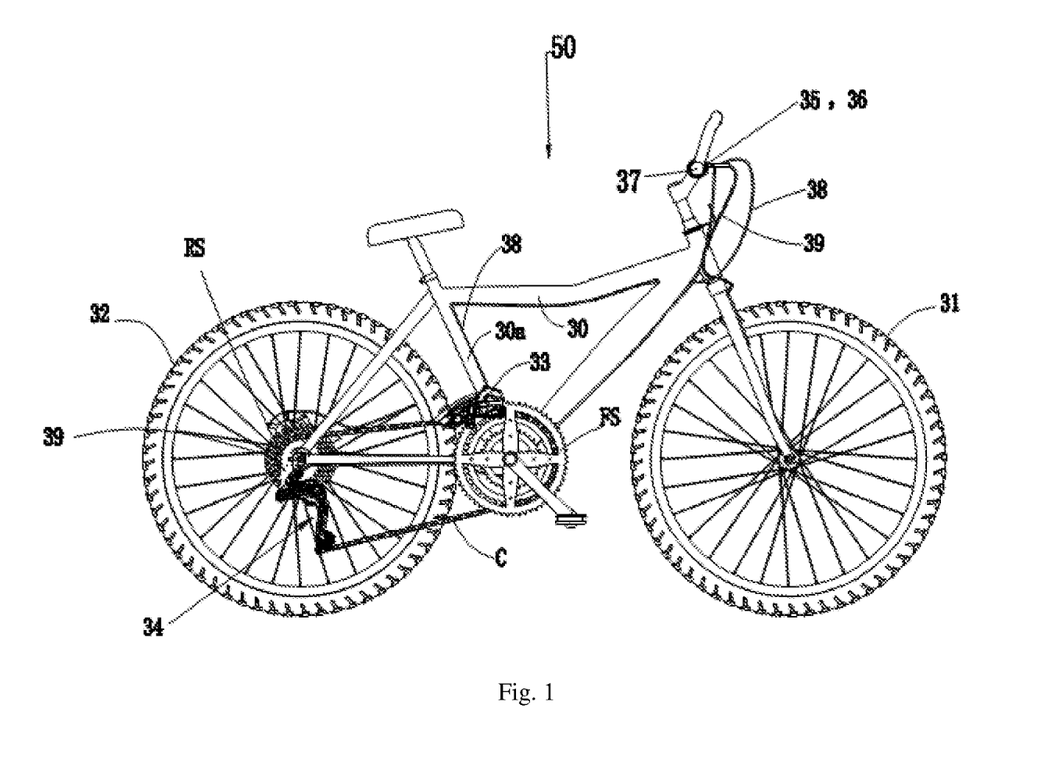
FIG. 1 is a side view of a bicycle provided with a transmission.

FIG. 1 shows a variable speed bicycle 50. The bicycle comprises a frame 30, a front wheel 31 and a rear wheel 32 which are rotatably connected to the frame 30 in a conventional manner; a front derailleur 33 mounted on a seat tube 30a of the frame 30, and a rear derailleur 34 mounted in the back of the frame 30. The front derailleur 33 switches a chain C among a plurality of front sprockets (FS); and the rear derailleur 34 switches the chain C among a plurality of rear sprockets (RS). Conventional speed switching control devices 35 and 36 are mounted on a bicycle handle 37, and are respectively used to control the front derailleur 33 and the rear derailleur 34 via conventional guide rope members 38 and 39. The present invention improves the rear derailleur 34 of the bicycle 50. The rear derailleur 34 will be discussed in detail only hereafter.

Figure 2:
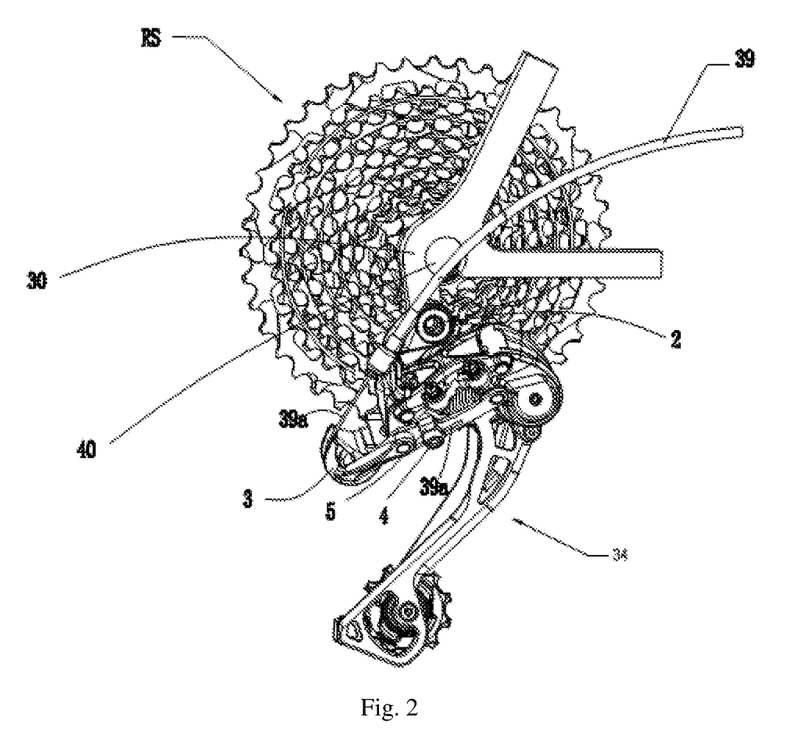
FIG. 2 is a front outer view of the rear derailleur mounted on a frame according to the present invention.
Figure 3:
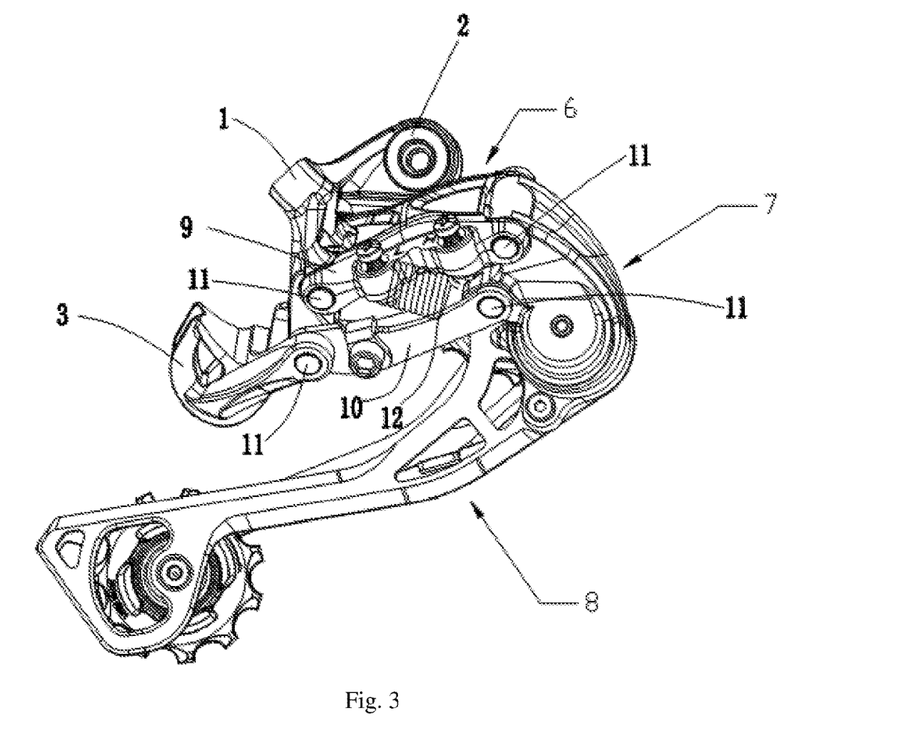
FIG. 3 is a side view of the rear derailleur according to the present invention.

With reference to FIGS. 2 and 3, FIG. 2 is a front outer view of the rear derailleur 34 mounted on a frame according to the present invention; and FIG. 3 is a stereoscopic structure schematic view of the rear derailleur 34. The rear derailleur 34 is rotatably mounted on a rear tail hook of the bicycle frame 30 via a base fixing bolt 2. The guide rope member 39 is mounted on a base member 1 of the rear derailleur 34; a wire core 39a of the guide rope member 39 penetrates through a variable speed driving arm 3, and is fixedly fastened via a bolt 4. The rear sprocket (RS) of the bicycle is connected to the bicycle frame 30 via a connecting shaft.

As shown in FIG. 3, the rear derailleur 34 of the present invention comprises a base member 1, a link assembly 6, a movable member 7 and a chain guide 8. The base member 1 is mounted on a frame tail hook; the link assembly 6 is connected between the base member 1 and the movable member 7 via a pin shaft 11; the link assembly 6 comprises a first link member 9 and a second link member 10; the chain guide 8 is rotatably connected to the movable member 7 via a rotation-with-resistance structure; therefore, the base member 1, the first link member 9, the second link member 10 and the movable member 7 form a parallelogram structure, such that the chain guide 8 can move to a plurality of switching positions corresponding to the number of the rear sprockets (RS); the movable member 7 is connected with a reset spring 12; and the reset spring 12 bias-compresses the movable member 6 transversely outwardly relative to the plurality of rear sprockets (RS), enabling the parallelogram structure to have a trend to maintain at a position with minimum contraction.

Figure 4:
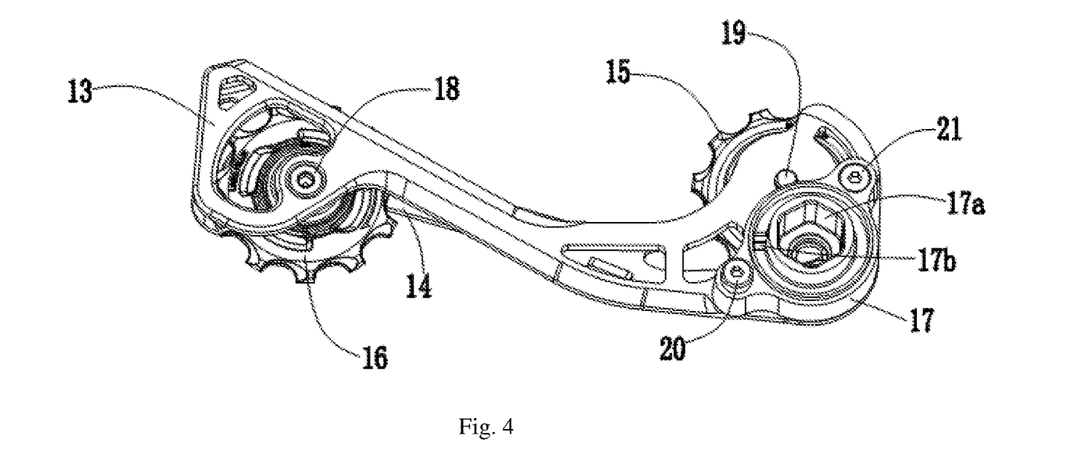
FIG. 4 is a side view of the chain guide in the present invention.

As shown in FIG. 4, the chain guide 8 comprises a first chain guide plate 13, a second chain guide plate 14, a guide pulley 15, a tension pulley 16 and a one-way bearing seat 17. The guide pulley 15 and the tension pulley 16 are respectively fixed between the first chain guide plate 13 and the second chain guide plate 14 via bolts 18 and 19; and the one-way bearing seat 17 is fixed on the first chain guide plate 13 via bolts 20 and 21.

Figure 5:
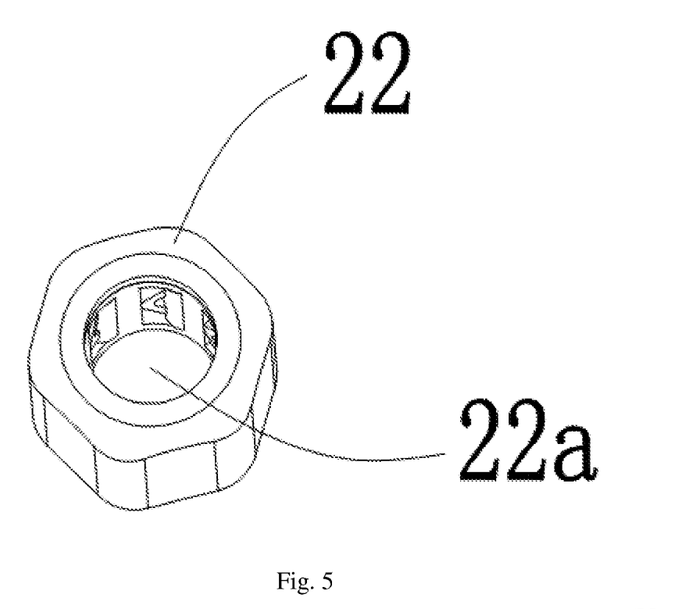
FIG. 5 is a side view of the one-way bearing in the present invention.

FIG. 5 shows a one-way bearing 2 used in one embodiment of the rear derailleur 34 of the present invention. The one-way bearing 22 is in a non-circular polygonal shape.

Figure 6:
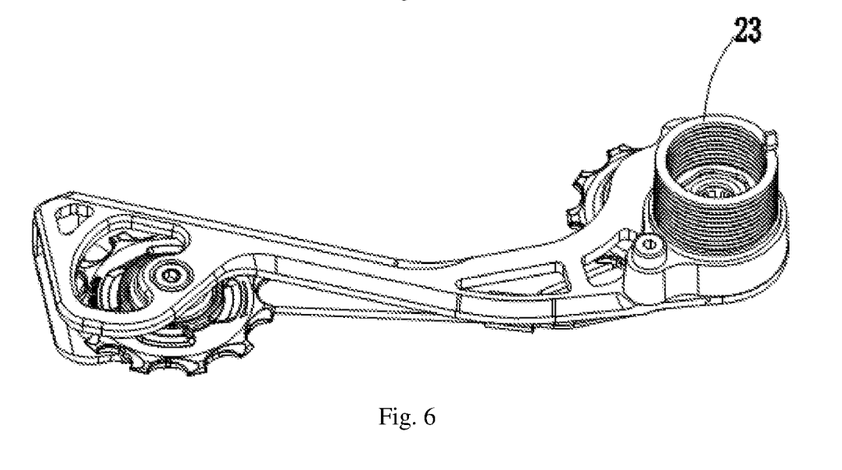
FIG. 6 is an assembly side view of the chain guide and the resistance application spring in the present invention.
Figure 7:
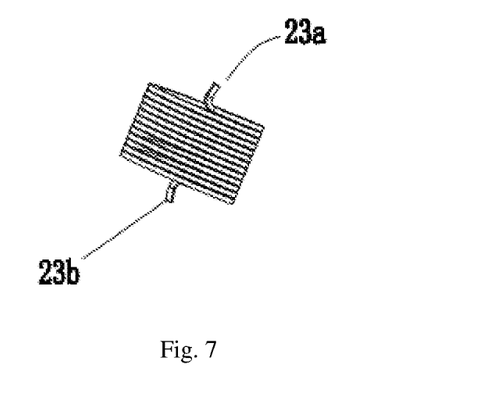
FIG. 7 is a stereoscopic structure schematic view of the resistance application spring in the present invention.
Figure 8:
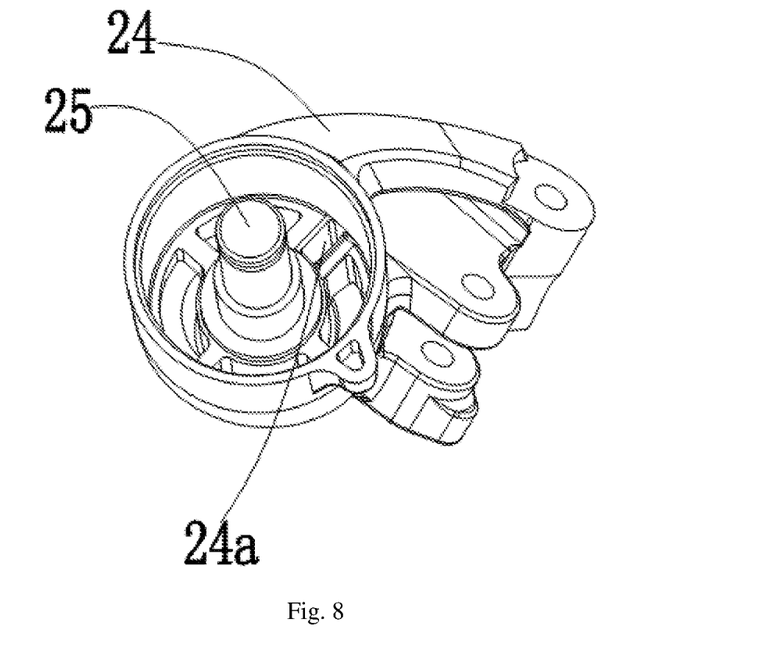
FIG. 8 is a side view of the movable member in the present invention.

FIG. 6 shows a side view of the chain guide 8 after the movable member 7 is moved away. FIG. 6 and FIG. 7 show a resistance application spring 23 for applying a backward rotation moment to the chain guide 8. The resistance application spring 23 is a torsion spring. After the resistance application spring 23 is assembled, a backward (clockwise) bias pressure is pre-generated to the chain guide 8. FIG. 8 shows a side view of the movable member 7. The movable member comprises a shell 24 and a rotary shaft 25.

Figure 9:
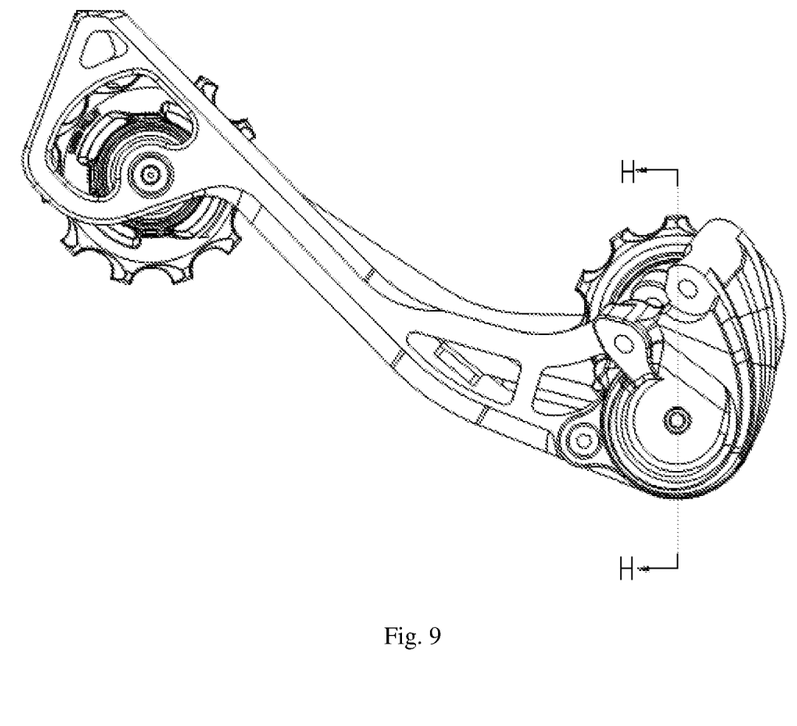
FIG. 9 is a stereoscopic structure schematic view of the movable member and the chain guide in the present invention.
Figure 10:
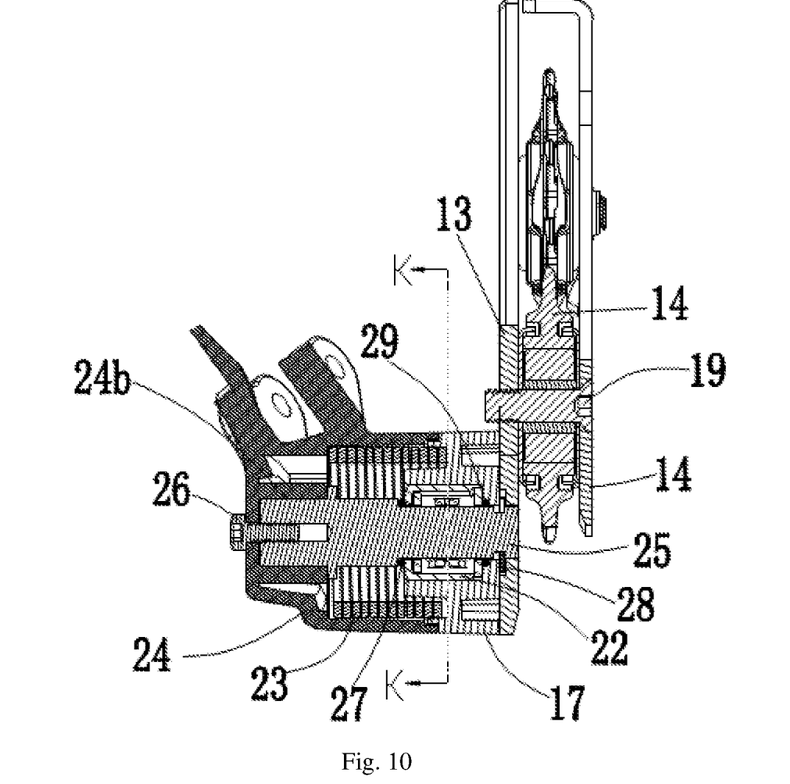
FIG. 10 is a sectional view along the H-H line in FIG. 9.

FIGS. 9 and 10 show the correct assembly positions of the various members of the rear derailleur 34 of the present invention. It can be seen from FIGS. 9 and 10 that the rotary shaft 25 of the movable member 7 is mounted in a mounting groove 24b of the shell 24 via a mounting portion 25a, and is fixedly fastened via a bolt 26; a first end 23a of the resistance application spring 23 is inserted in an inner groove 24a of the shell 24 of the movable member 7, and a second end 23b is inserted in a positioning groove 17b of the one-way bearing seat 17b (see FIGS. 4, 6 and 7), such that the resistance application spring 23 can generate a clockwise bias pressure to the chain guide 8; the one-way bearing 22 (which is a polygonal roller pin bearing in the embodiment) is mounted in a polygonal groove 17a of the one-way bearing 17, and is firmly fixed; the chain guide 8 is rotatably connected to the rotary shaft 25 of the movable member 8 via an inner hole 22a of the one-way bearing 22; a clamp spring contact 28 mounted in a rotary shaft groove 25c (see FIG. 13) of the rotary shaft 25 prevent the chain guide from disengaging; seal rings 27 and 29 respectively seal the two ends of the one-way bearing 22, preventing dust and other dirty objects from affecting and damaging the one-way bearing 22; and when the chain guide 8 generates a anti-clockwise rotation, the resistance application spring 23 would apply a clockwise rotation resistance to the chain guide.

With reference to FIGS. 8 and 10, the rotary shaft, the one-way bearing and the resistance application spring form a rotation-with-resistance structure. The rotary shaft 25 is in interference fit with an inner hole 22a of the one-way bearing.

Figure 11:
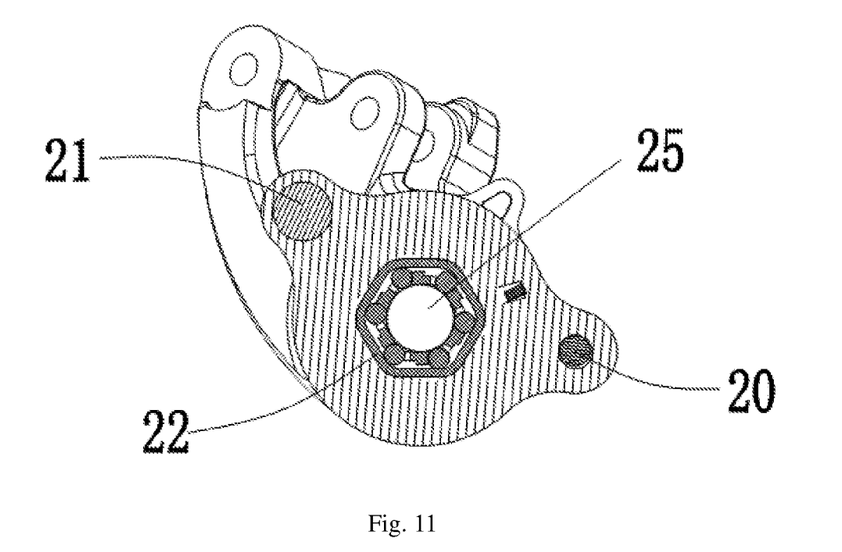
FIG. 11 is a sectional view along the K-K line in FIG. 9.
Figure 12:
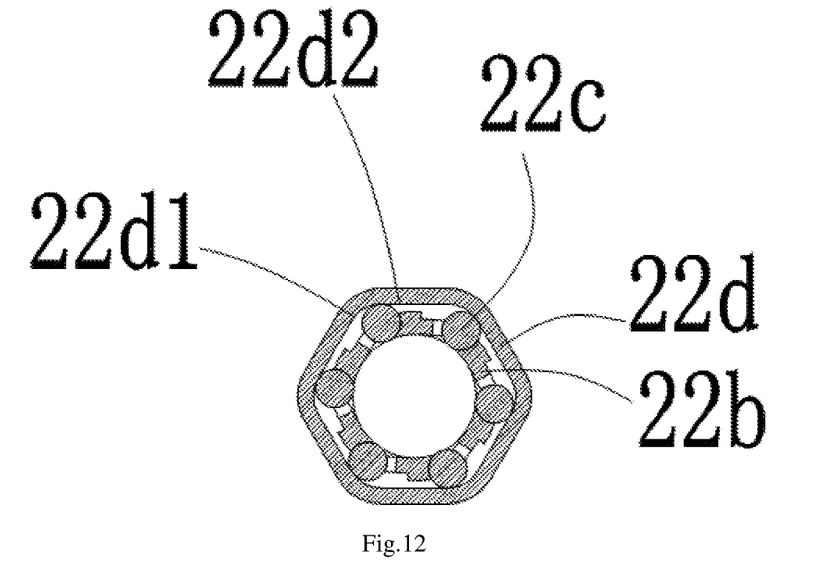
FIG. 12 is a sectional view of the one-way bearing in the present invention.

As shown in FIGS. 11 and 12, the one-way bearing 22 is already used in various aspects in industry, and the principle thereof is also well-known, namely: the one-way bearing 22 is cooperated with a rotary shaft 25 corresponding thereto; when the rotary shaft 25 or the one-way bearing 22 rotates, the one-way bearing smoothly rotates in one direction with no resistance, and cannot rotate under a resistance in another direction. As shown in FIG. 12, the one-way bearing 22 comprises a roller pin 22c, a support bracket 22b and a shell 22d. When the one-way bearing clockwise rotates, the roller pin 22c in the one-way bearing 22 will be pressed into a raceway 22d1 of the bearing shell 22d wider than the roller pin, in which case the rotary shaft and the roller pin 22c are in clearance fit; therefore, the rotary shaft is not pressed by the roller pin 22c, and naturally does not resist a resistance; when the one-way bearing anticlockwise rotates, the roller pin 22c will be pressed into a narrow raceway 22d2, in which case the roller pin 22c and the rotary shaft are interference fit; the rotation will generate a friction force, and the rotary shaft naturally resists a resistance.

With reference to FIGS. 11 and 12, by reasonably setting an interference x (equivalent to the difference between the outer diameter of the rotary shaft 25 and the pore diameter of the roller pin 22c when the roller pin 22c is located in the raceway 22d2) between the rotary shaft 25 and the inner hole of the one-way bearing 22, the one-way bearing 22 can generate a rotation resistance moment M(x) to the rotary shaft 25 in a non-free rotation direction; the rotation resistance moment M(x) is related to the interference x; the greater the interference x is, the greater the rotation resistance moment M(x) is, and vice versa; therefore, the value of the rotation resistance moment M(x) can be set by designing a specific interference x; the operation moment M1 generated to the chain guide 8 during a speed change operation can also be determined; the operation moment M1 enables the chain guide 8 to rotate forwards; furthermore, the maximum moment M2 that the chain guide 8 can resist when the bicycle bumps is an expected value, and can be set according to practical situations. Therefore, setting M(x) greater than M2 and less than M1 can achieve the objects of not influencing a normal speed change operation and resisting the moment during bumping. The one-way bearing 22 is generally a standard component; therefore, the rotation resistance moment M(x) can be adjusted only by controlling the size of the rotary shaft during machining. For example, for the type A one-way bearing, when the diameter of the rotary shaft 25 matched with one-way bearing is 8.0 mm, the rotation resistance moment M(x) is 12 Nm; the value of the rotation resistance moment M(x) can be changed by reducing the diameter of the rotary shaft matched with the one-way bearing, for example, when the diameter of the rotary shaft is in the range of 7.92 mm-7.93 mm, the rotation resistance moment M(x) would be in the range of 1.5 Nm-3.5 Nm.

Figure 13:
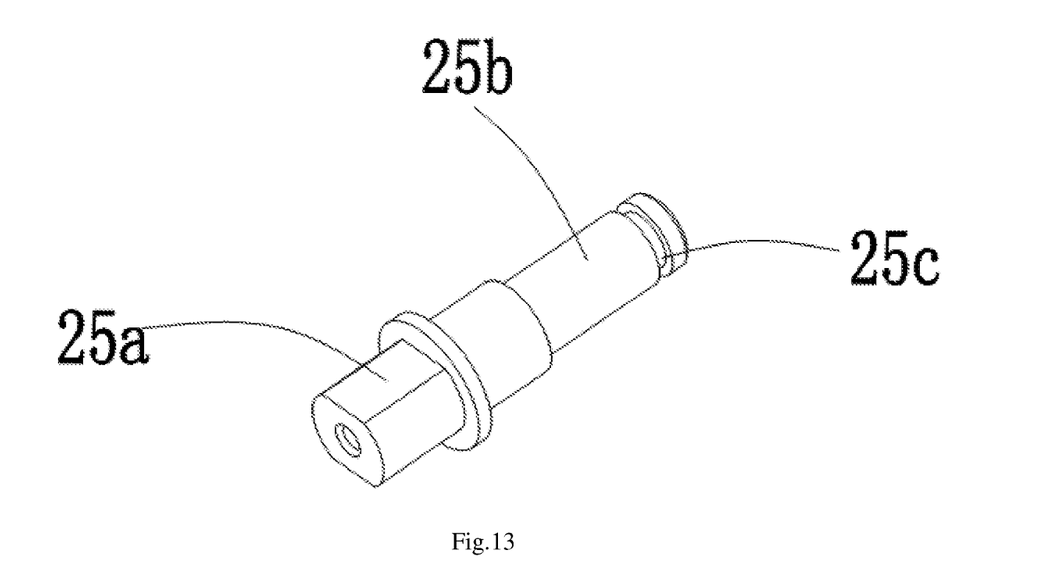
FIG. 13 is a side view of the rotary shaft according to the present invention.

FIG. 13 is a side view of the rotary shaft 25. A connecting section 25b of the rotary shaft 25 is the part matched with the one-way bearing 22, and is also the part generating a friction resistance.

With reference to FIG. 1-13, the resistance application method for applying resistance to a chain guide in the rear derailleur 34 in the present invention comprises the steps of:

(1) disposing a rotation-with-resistance structure between the movable member 7 and the chain guide 8 of the rear derailleur 34, wherein the rotation-with-resistance structure comprises a rotary shaft 25, a one-way bearing 22 and a resistance application spring 23; the rotary shaft is disposed on the movable member, and the one-way bearing is disposed on the chain guide; alternatively, the rotary shaft is disposed on the chain guide, and the one-way bearing is disposed on the movable member.

(2) applying an elastic force by the resistance application spring 23 to the chain guide 8, and enabling the chain guide 8 to always have a trend to rotate backward, wherein the rotary shaft forms an interference fit with an inner hole of the one-way bearing 22; and the free rotation direction of the one-way bearing corresponds to the backward rotation direction of the chain guide;

(3) setting the interference between the rotary shaft and the inner hole of the one-way bearing 22 as x, setting the rotation resistance moment corresponding to the interference x and generated by the one-way bearing 22 to the rotary shaft 25 in a non-free rotation direction as M(x); the operation moment applied to the chain guide during a speed change operation is M1; and the maximum preset moment the chain guide 8 can resist when a bicycle bumps is M2, $M2<M(x)<M1$.

The descriptions above are preferred embodiments of the present invention. However, the embodiments of the present invention are not limited by the above-described content. And any other variations, modifications, substitutions, combinations and simplifications made without departing from the essential spirit and principle of the present invention are all equivalent substitute modes, and should be all concluded in the protection scope of the present invention.

The invention claimed is:

1. A rear derailleur with rotation resistance application function, comprising;
   a base member,
   a link assembly,
   a movable member, and
   a chain guide,
   wherein the base member is mounted on a frame; the link assembly is flexibly connected between the base member and the movable member; and the chain guide is connected to the movable member via a rotation-with-resistance structure,
   wherein the rotation-with-resistance structure comprises a rotary shaft, a one-way bearing and a resistance application spring, wherein the rotary shaft is disposed on the movable member or the chain guide; the one-way bearing matched with the rotary shaft is correspondingly disposed on the chain guide or the movable member; the rotary shaft forms an interference fit with an inner hole of the one-way bearing,
   wherein the free rotation direction of the one-way bearing corresponds to the backward rotation direction of the chain guide; the interference between the rotary shaft and the inner hole of the one-way bearing is x; the rotation resistance moment corresponding to the interference x is M(x); the operation moment applied to the chain guide during a speed change operation is M1, and the maximum preset moment the chain guide can resist when a bicycle bumps is M2, wherein $M2<M(x)<M1$.

2. The rear derailleur with rotation resistance application function according to claim 1, wherein the rotary shaft is disposed on the movable member; and the one-way bearing is disposed on the chain guide.

3. The rear derailleur with rotation resistance application function according to claim 2, wherein the chain guide comprises a first chain guide plate, a second chain guide plate, a guide pulley, a tension pulley and a one-way bearing seat, wherein the guide pulley and the tension pulley are respectively fixed between the first chain guide plate and the second chain guide plate via bolts; the one-way bearing seat is fixed on the first chain guide plate via bolts; and the one-way bearing is disposed in the one-way bearing seat.

4. The rear derailleur with rotation resistance application function according to claim 3, wherein the one-way bearing comprises a roller pin, a support bracket and a shell, wherein the shell is polygonal; a polygonal groove matched with the polygonal shell of the one-way bearing is disposed in the one-way bearing seat; and the one-way bearing is embedded in the polygonal groove.

5. The rear derailleur with rotation resistance application function according to claim 4, wherein seal rings are disposed in the polygonal groove on the two sides of the one-way bearing.

6. The rear derailleur with rotation resistance application function according to claim 2, wherein the movable member comprises a shell; and the rotary shaft is mounted in a mounting groove of the shell via a mounting portion at an end thereof, and is fastened via a bolt.

7. The rear derailleur with rotation resistance application function according to claim 6, wherein the resistance application spring is a torsion spring; a first end of the resistance application spring is inserted in an inner groove of the shell of the movable member, and a second end is inserted in a positioning groove of the one-way bearing seat; and the resistance application spring generates a bias pressure for enabling the chain guide to rotate backwards.

8. The rear derailleur with rotation resistance application function according to claim 1, wherein the base member is mounted on a frame tail hook; the link assembly is connected between the base member and the movable member via a pin shaft; the link assembly comprises a first link member and a second link member; the base member, the first link member, the second link member and the movable member form a parallelogram structure; the movable member is connected with a reset spring; and the reset spring bias-compresses the movable member transversely outwardly relative to a plurality of rear sprockets, enabling the parallelogram structure to have a trend to maintain at a position with minimum contraction.

9. A resistance application method for applying resistance to a chain guide in a rear derailleur, comprising the steps of:
(1) disposing a rotation-with-resistance structure between a movable member and the chain guide of the rear derailleur, wherein the rotation-with-resistance structure comprises a rotary shaft, a one-way bearing and a resistance application spring; the rotary shaft is disposed on the movable member, and the one-way bearing is disposed on the chain guide; alternatively, the rotary shaft is disposed on the chain guide, and the one-way bearing is disposed on the movable member;
(2) applying an elastic force by the resistance application spring to the chain guide, enabling the chain guide to always have a trend to rotate backward, wherein the rotary shaft forms an interference fit with an inner hole of the one-way bearing; and the free rotation direction of the one-way bearing corresponds to the backward rotation direction of the chain guide;
(3) setting the interference between the rotary shaft and the inner hole of the one-way bearing as x, setting the rotation resistance moment corresponding to the interference x and generated by the one-way bearing to the rotary shaft in a non-free rotation direction as $M(x)$; the operation moment applied to the chain guide during a speed change operation is $M1$; and the maximum preset moment the chain guide can resist when a bicycle bumps is $M2$, wherein $M2<M(x)<M1$.

* * * * *

UNITED STATES PATENT AND TRADEMARK OFFICE
CERTIFICATE OF CORRECTION

PATENT NO. : 11,148,754 B2  Page 1 of 1
APPLICATION NO. : 16/496589
DATED : October 19, 2021
INVENTOR(S) : Ruizan Qin It is certified that error appears in the above-identified patent and that said Letters Patent is hereby corrected as shown below:

On the Title Page

Column 1, Item (73) Assignee, Line 2, delete "Ltd." and insert -- Ltd., (CN) --

In the Claims

Column 8, Line 3, Claim 1, delete "comprising;" and insert -- comprising: --

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*